US005704399A

United States Patent [19]

Hayashi et al.

[11] Patent Number: 5,704,399

[45] Date of Patent: Jan. 6, 1998

[54] CHAINED MULTIPLE CONNECTION CHANGE-OVER VALVE ASSEMBLY

[75] Inventors: Bunya Hayashi; Shinji Miyazoe, both of Yawara-mura, Japan

[73] Assignee: SMC Corporation, Tokyo, Japan

[21] Appl. No.: 678,758

[22] Filed: Jul. 11, 1996

[30] Foreign Application Priority Data

Jul. 21, 1995 [JP] Japan ........................ 7-207927

[51] Int. Cl.$^{6}$ ........................ F16K 11/20

[52] U.S. Cl. ........................ 137/884; 137/271

[58] Field of Search ........................ 137/271, 884

[56] References Cited

U.S. PATENT DOCUMENTS 4,718,451 1/1988 Kosugi ........................ 137/884 X 5,318,072 6/1994 Goedecke ........................ 137/884

*Primary Examiner*—John Fox

*Attorney, Agent, or Firm*—Oblon, Spivak, McClelland, Maier & Neustadt, P.C.

[57] ABSTRACT

A chained multiple connection change-over valve assembly of an extremely compact form in thickness, formed by connecting a plural number of multiplex change-over valve units of a flatly thin shape successively in a lateral direction, each change-over valve unit containing a plural number of fluid switching mechanisms within a valve casing side by side in a transverse direction and having a plural number of output ports on a front face of the valve casing in a row in the transverse direction.

6 Claims, 6 Drawing Sheets

CHAINED MULTIPLE CONNECTION CHANGE-OVER VALVE ASSEMBLY

BACKGROUND OF THE INVENTION

1. Field of the Art

This invention relates to a chained, multiple connection change-over valve assembly having a plural number of change-over valve units connected one after another in a lateral direction, and more particularly to a chained change-over valve assembly of an extremely thin and compact form which can be installed even in narrow limited spaces.

2. Prior Art

There have been known in the art the technologies for a multiple connection change-over valve assembly consisting of a plural number of change-over valve units which are integrally connected one after another into a chained assembly for the purpose of supplying or discharging a pressurized fluid such as compressed air or hydraulic oil for a number of fluid operating systems in a concentrated manner. For example, it is known in the art to build a chained multiple connection change-over valve assembly by mounting a plural number of change-over valve units on a corresponding number of manifold bases which contain pressurized fluid supply and discharge passages for the respective valve units and which are successively connectible in the fashion of a chain.

However, difficulties are often experienced with a known chained change-over valve assembly of the sort as mentioned above, in that the individual change-over valve units, which are generally constructed to have a larger dimension in height than in width, are often found too bulky especially when mounted on manifold bases. Accordingly, the resulting chained multiple connection change-over valve assembly is difficult to install in narrow limited spaces due to bulkiness in height.

As for another example of chained multiple connection change-over valve assembly, it is also known in the art to use a rail for mounting and connecting a plural number of change-over valve units each containing pressurized fluid supply and discharge passages. A chained multiple connection change-over valve assembly of this sort is reduced in height as compared with the above-described manifold base type, but is still too big in height because of the existence of a plural number of output ports which are arranged in a vertical row on the front face of each change-over valve unit, likewise restricting application of the multiple connection valve assembly.

Besides, the job of connecting individual change-over valve units has been troublesome and time-consuming especially in case a large number of change-over valve units need to be connected one after another into a long chain.

SUMMARY OF THE INVENTION

It is a primary object of the present invention to provide a multiple connection change-over valve assembly of a flatly compact form which is sufficiently reduced in size, especially in height, by the use of change-over valve units of a low and flat shape which can be directly connected one after another in a lateral direction.

It is another object of the present invention to provide a multiple connection change-over valve assembly employing change-over valve units which can be coupled with each other easily by simple coupling means in a reliable manner.

It is still another object of the present invention to provide a multiple connection change-over valve assembly which is composed of a plural number of complex change-over valve units each containing a plural number of fluid switching mechanisms in such a manner as to minimize the length of the chained change-over valve assembly and at the same time lessening the number of connections in forming an assembly with a given number of fluid switching mechanisms.

In order to achieve the above-stated objectives, the present invention provides a chained multiple connection change-over valve assembly composed of a plural number of laterally connected multiplex change-over valve units of a flatly thin shape.

The above-mentioned multiplex change-over valve units are each constituted by: a valve casing of a flat shape measuring smaller in height than in width, the height of the valve unit being of a minimum necessary dimension for accommodation of one fluid switching mechanism or one output port whichever has a larger dimension in the vertical direction of the valve casing; a plural number of fluid switching mechanisms built into the valve casing side by side in the transverse direction thereof for switching flow directions of a pressurized fluid; joint faces provided on the opposite lateral sides of the valve casing for directly connecting the change-over valve unit to adjacent valve units; pressurized fluid supply and discharge passages opened in the joint faces in communication with the respective fluid switching mechanisms for supplying and discharging the pressurized fluid; and a plural number of output ports provided on a front face of the valve casing in a row in the transverse direction and in communication with the respective fluid switching mechanism.

In a more specific form of the invention, the valve casing of each multiplex change-over valve unit is provided with coupling projections on one of the joint faces and joint grooves on the other joint face, the coupling projections and grooves being engageable with and fixable to similar coupling grooves and projections on valve casings of adjacent multiplex change-over valve units by the use of a locking means.

According to a preferred form of the invention, the pressurized fluid supply and discharge passages of adjacent multiplex change-over valve units are connected with each other by way of connector pipes having the opposite ends thereof fitted fluid tight in the fluid supply and discharge passages of adjacent valve units.

According to another specific form of the invention, a supply and discharge manifold block or a combination of a supply and discharge manifold block and a connector box is connected to at least one of head and tail ends of the chained multiple connection change-over valve assembly, the supply and discharge manifold block and the connector box being formed substantially in the same height as the multiplex change-over valve unit, the supply and discharge manifold block being provided with a supply port and a discharge port on a front end face side by side in the transverse direction and in communication with the pressurized fluid supply and discharge passages of a change-over valve unit at the head or tail end, and the connector box being provided with a multi-way connector to be connected to an electric power supply to distribute electric power to the respective change-over valve units.

According to the present invention with the above-described arrangements, a multiple connection change-over valve assembly of an extremely thin and flat configuration can be obtained by successively connecting lateral sides of the multiplex change-over valve units which are each in a thin and flat form.

Besides, the multiplex change-over valve units can be coupled successively in a secure manner by means of the coupling projections and grooves which are provided on the adjoining lateral sides of the valve casings of the respective multiplex change-over valve units.

Further, since each one of the multiplex change-over valve units is provided with a plural number of fluid switching mechanisms within a single valve casing, it becomes possible to cut the length of the multiple connection change-over valve assembly as a whole and to reduce the number of connections in laterally connecting change-over valve units for a given number of fluid switching mechanisms, as compared with the multiple connection change-over valve assembly using ordinary change-over valve units each containing only one fluid switching mechanism within a valve casing.

PARTICULAR DESCRIPTION OF THE INVENTION

Figure 1:
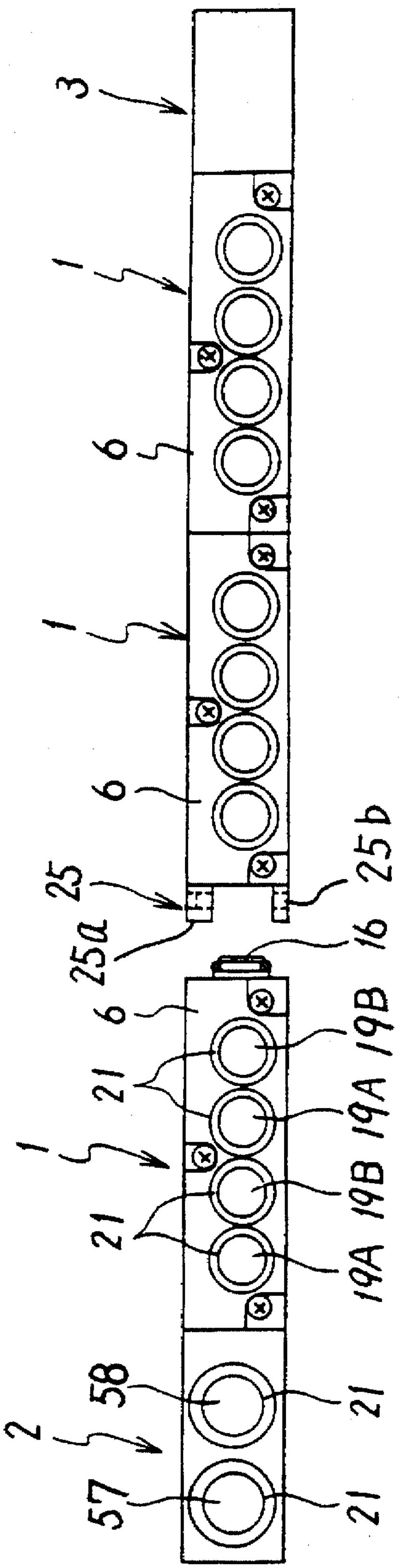
FIG. 1 is a schematic front view of a chained multiple connection change-over valve assembly according to the present invention, with part of the assembly disconnected for the sake of illustration.
Figure 2:
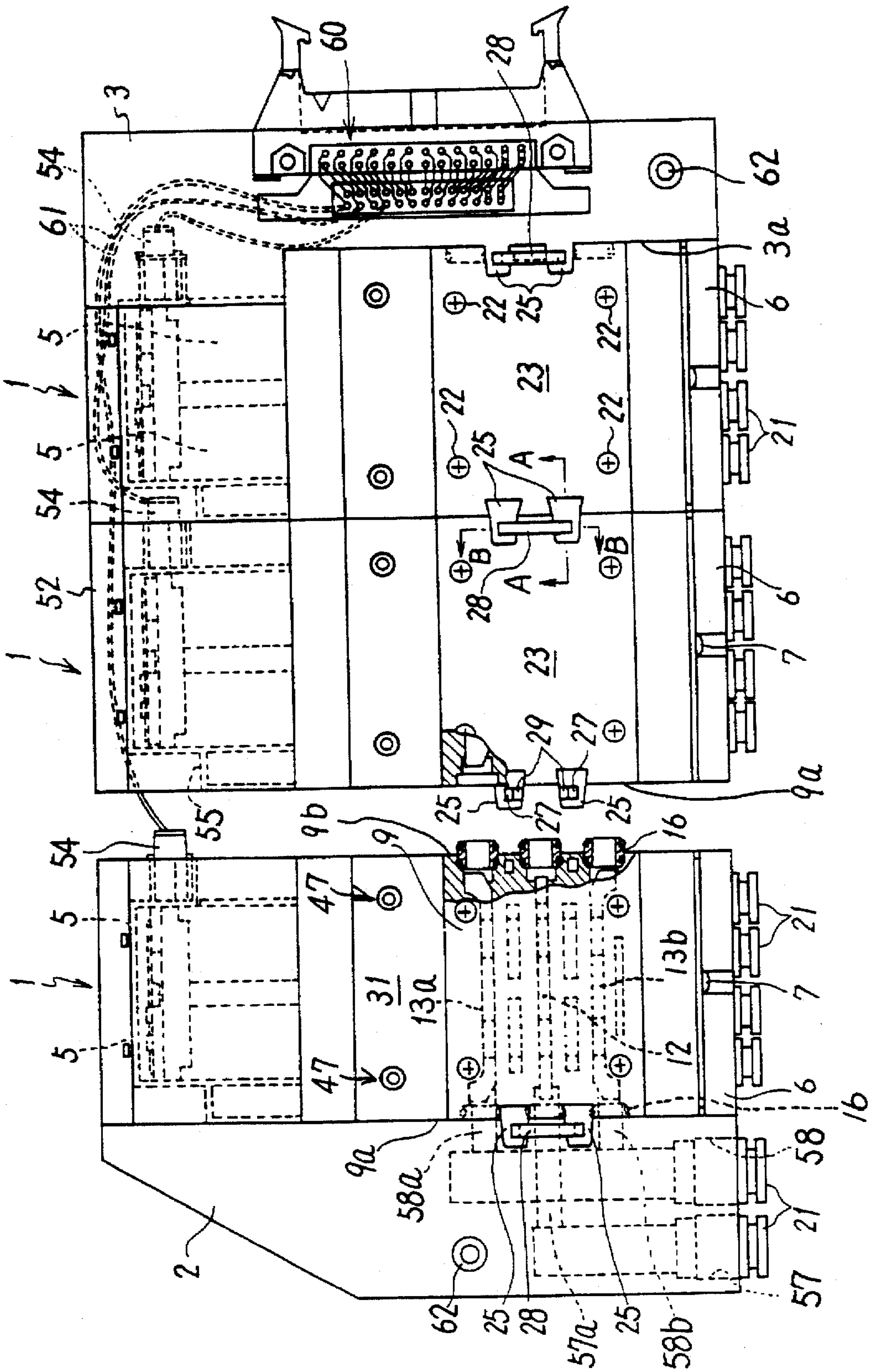
FIG. 2 is a schematic plan view of the multiple connection change-over valve assembly of FIG. 1.

Referring to FIGS. 1 and 2, there is shown an embodiment of the chained multiple connection change-over assembly according to the present invention, which is partly shown in a disconnected state. This multiple connection change-over valve assembly is constituted by a plural number of multiplex change-over valve units 1 (three multiplex change-over valve units in the particular embodiment shown) which are successively connected in a lateral direction, a supply and discharge manifold block 2 which is attached to one end of the chained change-over valve assembly, and a connector box 3 which is attached to the other end of the chained change-over valve assembly.

Figure 6:
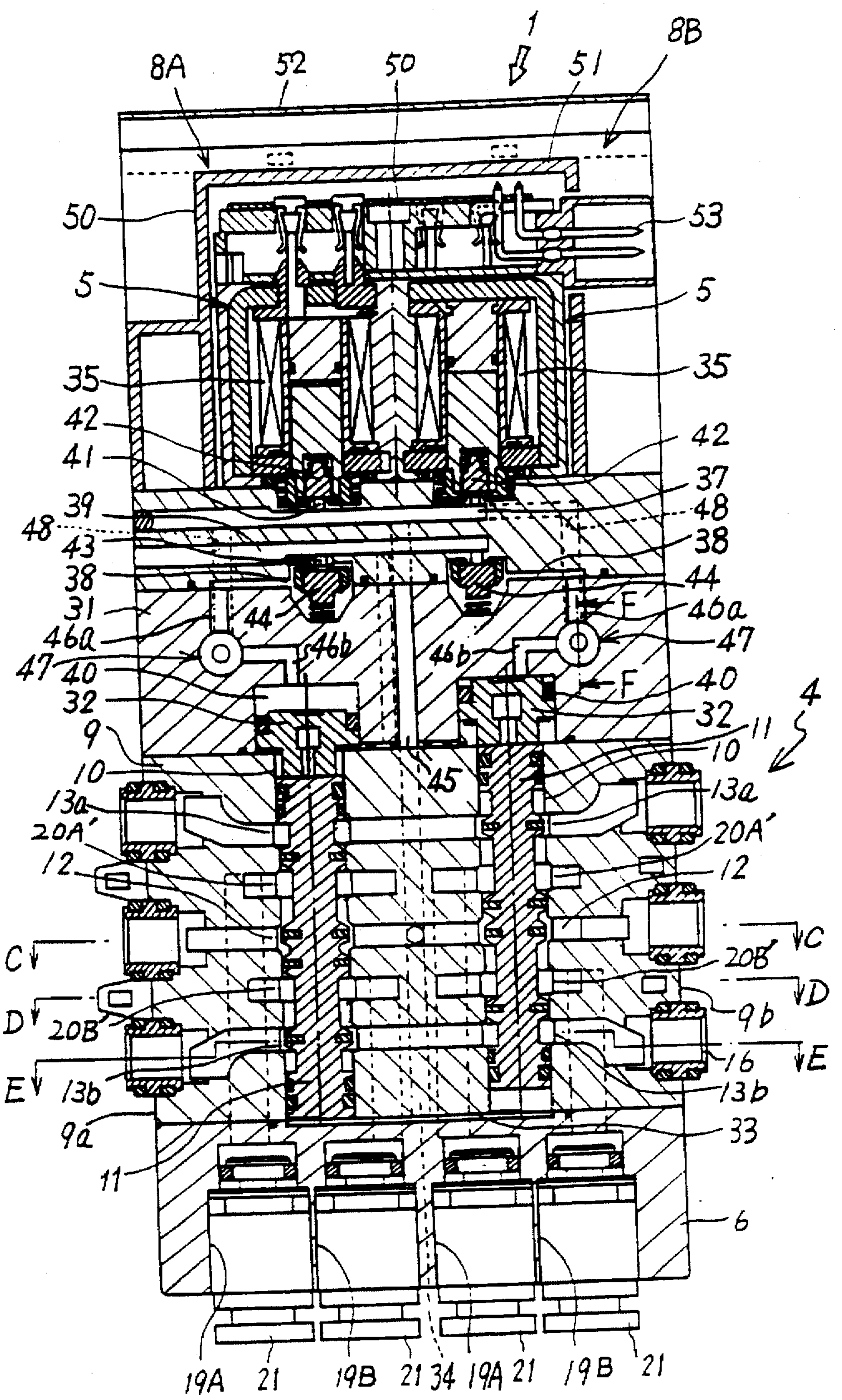
FIG. 6 is a transversely sectioned plan view of one multiplex change-over valve unit 1.

As seen in FIG. 6, each multiplex change-over valve unit 1 accommodates a couple of independently operative fluid switching mechanisms 8A and 8B side by side in a lateral or transverse direction within a valve casing 9. These fluid switching mechanisms 8A and 8B are arranged substantially in the same manner in construction, including a main valve section 4 with a spool type valve member 11 and a pilot valve section 5 for driving the valve member 11 as will described in greater detail hereinbelow.

The valve casing 9 of each multiplex change-over valve unit 1 is formed substantially in a flat thin box-like shape having a minimum height which is necessary for containing one fluid switching mechanism 8A or 8B or one output port 19A or 19B whichever has a greater dimension in height.

As shown in FIGS. 7 to 10, the valve casing 9 is internally provided with a couple of valve bores 10, which are juxtaposed in the transverse direction, and the above-mentioned valve member 11 is slidably fitted in each one of the valve bores 10. Fitted in a plural number of grooves on the circumference of the valve member 11 are seal members 11*a* which are held in sliding contact with the valve bore 10 to switch flow directions of a fluid medium.

Figure 5:
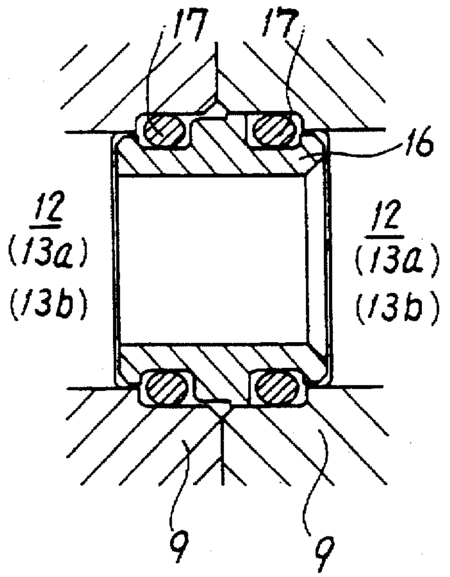
FIG. 5 is an enlarged sectional view of connector pipes which intercommunicate fluid conduits of two adjacent change-over valve units.

Each valve casing 9 is provided with joint faces 9*a* and 9*b* on lateral sides to be coupled with adjacent change-over valve units. Opened in these joint faces 9*a* and 9*b* is a fluid supply passage 12 which is in communication with both of the two valve bores 10 to supply a pressurized fluid thereto, along with first and second fluid discharge passages 13*a* and 13*b*. As shown on an enlarged scale in FIG. 5, the supply passage 12 and discharge passages 13*a* and 13*b* of the multiplex change-over valve unit 1 are connected to the corresponding supply passage 12 and discharge passages 13*a* of an adjacent multiplex change-over valve unit 1 by connector pipes 16 of a short cylindrical shape, which have opposite end portions equally fitted into the open ends of opposing supply passages 12 and discharge passages 13*a* and 13*b* of the adjoining change-over valve units 1 in fluid-tight state by the use of O-rings 16, respectively.

The valve casing 9 is provided with a port block 6 on its front side, the port block 6 containing two pairs of (four) output ports 19A and 19B in a row in the transverse direction of the valve casing 9. These output ports 19A and 19B are separately communicated with the afore-mentioned valve bores 10 through flow passages 20A and 20B. Attached to each one of the output ports 19A and 19B is a quick push-in type pipe joint 21 which permits to connect a tube simply by a push-in action.

The above-described fluid supply passage 12 and discharge passages 13*a* and 13*b* as well as those portions of the fluid passages 20A and 20B which surround the valve bores 10 as indicated at 20A' and 20B' are formed by providing grooves of predetermined depths on the top side of the valve casing 9 and closing them with a seal plate 23 which is securely fixed on the top side of the valve casing 9 by means of screws 22. Therefore, these portions of the fluid passages can be formed extremely easily because the valve casing 9 can be fabricated by injection molding, if desired, from the standpoint of simplifying the construction of the valve casing 9 while facilitating its fabrication process.

Further, the valve casing 9 is provided with an adapter plate 31 in its rear end portion in association with the pilot valve section 5.

At the inner ends of the valve bores 10, the adapter plate 31 is provided with piston chambers 30 which are larger than the valve bores 10 in diameter, the piston chambers 30 slidably receiving pistons 32 for driving the valve members 11. For a returning action, each valve members 11 is provided with a pressure receiving area, which is smaller than that of the piston 32, at the end away from the piston chamber 30. The pressure receiving areas of the valve members 11 are disposed in a common pressure chamber 33 which is constantly in communication with the supply fluid passage 12 through a fluid passage 34 which is provided in the valve casing 9.

The pilot valve section 5 is constituted by a couple of electromagnetic valves which supply and discharge a pilot fluid to and from pilot chambers 40 behind the pistons 32 by turning on and off solenoids 35, respectively. More specifically, each pilot valve 5 is provided with a pilot supply valve member 42 to open and close a valve bore 41 intervening between a pilot supply passage 37 and a pilot output passage 38, and a pilot discharge valve member 44 to open and close a valve bore 43 intervening between the pilot output passage 38 and a discharge passage 39. The pilot supply passage 37 is in communication with the above-described supply passage 12 through a pilot flow passage 45, while the pilot output passage 38 is in communication with the pilot chamber 40 by way of a manual operating mechanism 47 via pilot flow passages 46a and 46b. The above-mentioned pilot discharge passage 39 is opened to the outside.

Accordingly, upon turning on the solenoid 35, the pilot supply valve member 42 is opened and at the same time the pilot discharge valve member 44 is closed, communicating the pilot supply passage 37 and the pilot output passage 38 with each other as indicated by the pilot valve 5 on the right side in FIG. 6. As a result, the pilot fluid flows into the pilot chamber 40 by way of the manual operating mechanism 47 via pilot flow passages 46a and 46b, switching the valve member 11 to the position as indicated by its left half portion in the drawing. On the other hand, when the solenoid 35 is turned off, the pilot supply valve member 42 is closed and the pilot discharge valve member 44 is opened as indicated by the pilot valve 5 on the left side in FIG. 6, communicating the pilot output passage 38 with the pilot discharge passage 39. As a result, the pilot fluid is discharged out of the pilot chamber 40 to switch the valve member 11 to the position indicated by its right half portion in the drawing.

Figure 11:
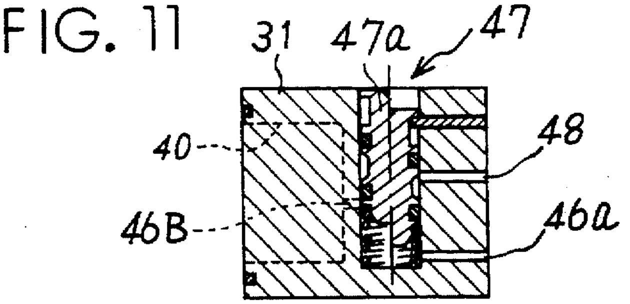
FIG. 11 is a schematic sectional view taken on line F—F of FIG. 6.

As shown in FIG. 11, the manual operating mechanism 47 is provided on the adapter plate 31, and communicated with the pilot supply passage 37 through a pilot fluid passage 48. By pushing down an operating button 47a as indicated by a right half portion in FIG. 11, the pilot fluid passage 48 is communicated with the pilot fluid passage 46b to supply the pilot fluid directly to the pilot chamber 40 from the pilot supply passage 37.

Figure 7:
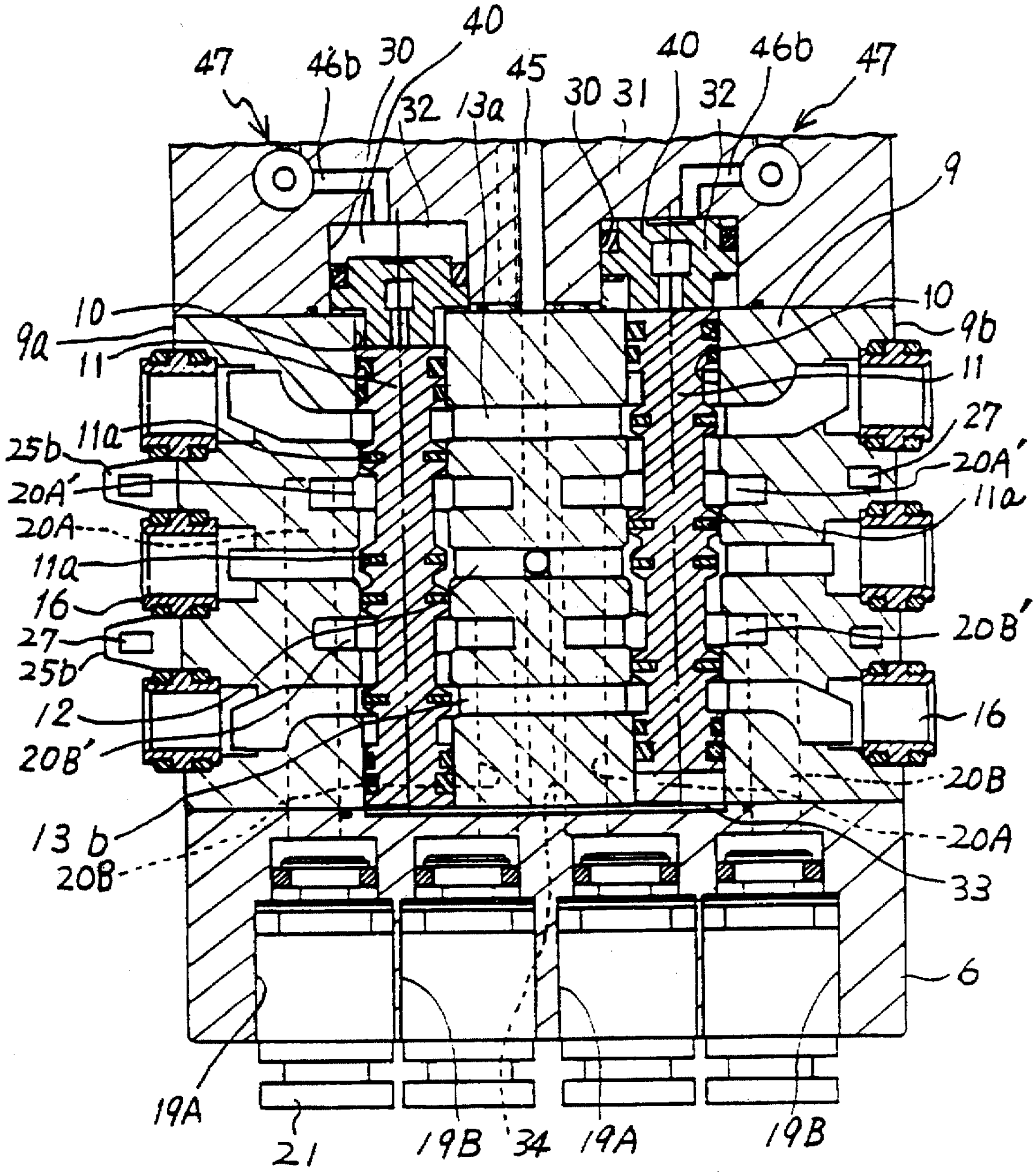
FIG. 7 is an enlarged view of certain major components of the multiplex change-over valve unit of FIG. 6.
Figure 8:
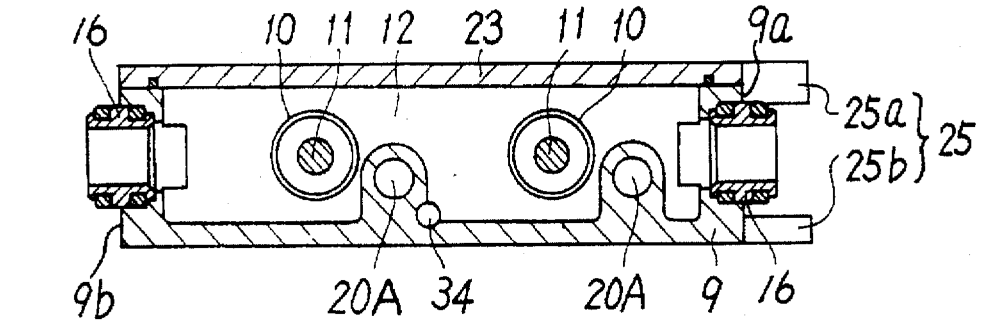
FIG. 8 is a schematic sectional view taken on line C—C of FIG. 6.
Figure 9:
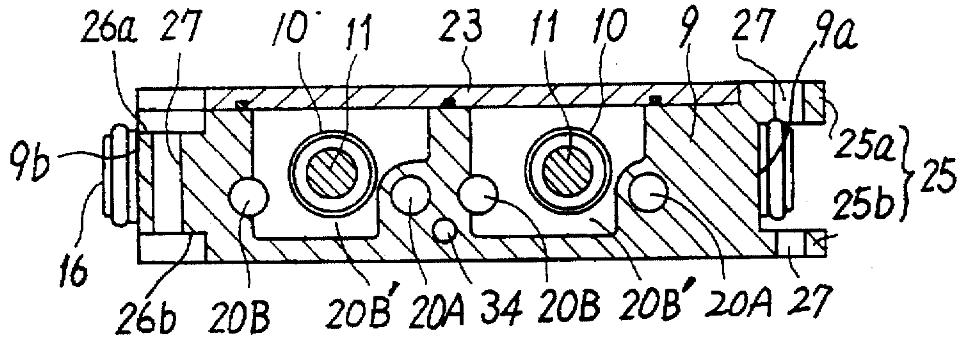
FIG. 9 is a schematic sectional view taken on line D—D of FIG. 6.
Figure 10:
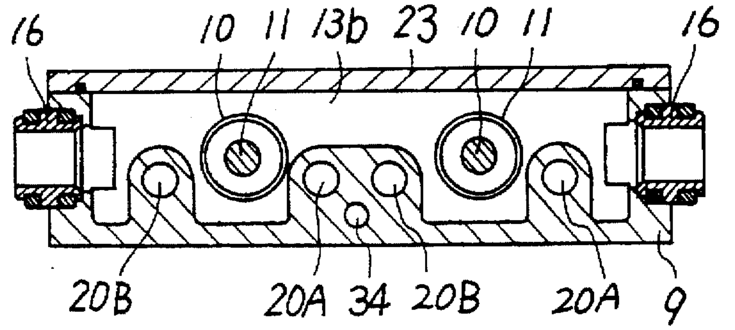
FIG. 10 is a schematic sectional view taken on line E—E of FIG. 6.

In the main valve section 4, when the valve member 11 is switched to the position as indicated by its left half portion in FIGS. 6 and 7, the fluid supply passage 12 is put in communication with the first output port 19A while the second fluid discharge passage 13b is put in communication with the second output port 19B. As soon as the valve member 11 is returned to the position as indicated by its left half portion in FIGS. 6 and 7, the fluid supply passage 12 is communicated with the second output port 19B, and the first fluid discharge passage 13a is communicated with the first output port 19A. Thus, in this instance, the main valve section 4 is arranged to operate substantially as a 5-port valve.

Figure 3:
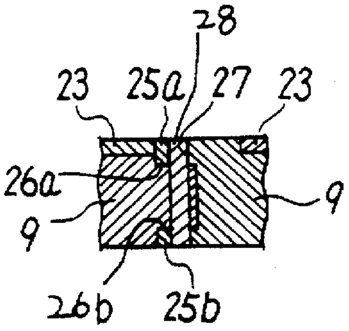
FIG. 3 is a schematic sectional view taken on line A—A of FIG. 2.
Figure 4:
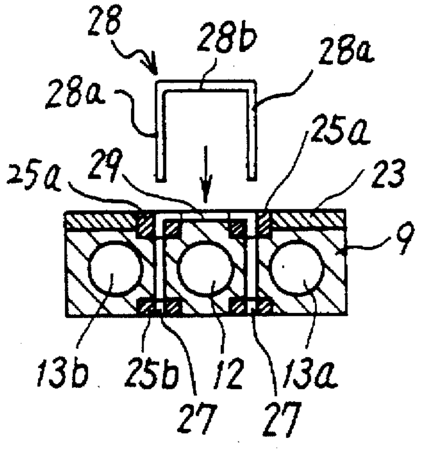
FIG. 4 is a schematic sectional view taken on line B—B of FIG. 2.

In order to couple adjacent multiplex change-over valve units securely with each other, each change-over valve unit 1 is provided with a male coupling means 25 on the joint face 9a on one lateral side of the valve casing 9. The male coupling means 25 is constituted by two pairs of coupling projections 25a and 25b which are formed vertically in face to face relation with each other, one pair being located in a spaced position from the other pair in the forward or rearward direction of the valve casing 9. Provided on the other joint face 9b on the opposite lateral side of the valve casing 9 are two pairs of coupling grooves 26a and 26b for engagement with coupling grooves 25a and 25b on an adjacent change-over valve unit 1. As seen in FIGS. 3 and 4, locking holes 27 are formed vertically through coupling positions of the paired coupling projections 25a and 25b and the coupling grooves 26a and 26b, and legs 28a of a substantially U-shaped locking member 28 are inserted into the locking holes 27 from above to connect the adjacent change-over valve units 1 securely to each other. In this instance, it is desirable to provide a Groove or sunken channel 29 on the top side of the valve casing 9 between the locking holes 27 to receive therein a head portion 28b of the locking member 28, thereby preventing the latter from protecting on the upper side of the valve casing 9.

The upper ones 25a of the paired upper and lower coupling projections 25a and 25b are protruded upward to a level flush with the top surface of the sealing plate 23 on the upper side of the valve casing 9, through notches which are formed at the lateral side edges of the sealing plate to escape the coupling projections 25a.

A terminal plate 50 is mounted on the pilot valve section 5 to supply electric power to the solenoids 35. The terminal plate 50 is encased in a terminal cover 51 which is in turn encased in an outer cover 52.

The terminal plate 50 is electrically connected to a receiving terminal 53 which supplies electric power collectively to the respective solenoids 35. On the other side away from the receiving terminal 53, the terminal cover 51 is provided with a recess 55 to accommodate a feeder socket 54 (FIG. 2) which is connected to a receiving terminal 53 on an adjoining change-over valve unit.

The afore-mentioned supply and discharged manifold block 2 is formed substantially in the same height as the respective multiplex change-over valve units 1, and provided with a joint face 2a on a lateral side to be joined with the terminal change-over valve unit 1. A supply channel 57a and a couple of discharge channels 58a and 58b, which are opened on the joint face 2a, are connected to the supply channel 12 and a couple of discharge channels 13a and 13b by way of the connection pipes 16.

The supply and discharge manifold block 2 is coupled with the multiplex change-over valve unit 1 at the head position of the chained change-over valve assembly through the same coupling means as used between the adjacent change-over valve units 1, more specifically, through paired coupling projections 25a and 25b and opposing coupling grooves 26a and 26b and locking members 28. In the particular embodiment shown, the paired coupling projections 25a and 25b are provided on the part of the head change-over valve unit 1 for engagement with coupling grooves 26a and 26b which are provided on the part of the supply and discharge manifold block 2. However, in case the supply and discharge manifold block 2 is connected to a change-over valve at the tail end of the chained multiple connection change-over valve assembly, the coupling projections 25a and 25b are provided on the part of the manifold block 2 for engagement with the coupling grooves 26a and 26b on the other lateral side of the terminal change-over valve unit.

Provided on the front face of the supply and discharge manifold block 2 side by side in the transverse direction are a supply port 57, which communicates with the afore-mentioned supply channel 57a, and an discharge port 58 which communicates with both of a couple of discharge passages 58$a$ and 58$b$. A quick push-on type pipe joint 21 is attached to each one of these supply port 57 and discharge port 58.

Accordingly, a pressurized fluid such as compressed air can be collectively fed to and from a plural number of multiplex change-over valve units 1 through the supply and discharge ports 57 and 58 of the manifold block 2.

Although the supply and discharge ports 57 and 58 are slightly larger in diameter than the output ports 19A and 19B on the multiplex change-over valve unit 1, the manifold block 2 suffices to have a height corresponding to that of a single fluid supply port because the ports 57 and 58 are provided in a row in the transverse direction. It follows that the thickness of the chained multiple connection change-over valve assembly can be reduced to a marked degree as compared with the conventional counterparts in which fluid supply and discharge ports are usually provided in a row in the vertical direction.

The above-mentioned connector box 3 is formed substantially in the same height as the respective multiplex change-over valve units 1, and provided with a joint face 3$a$ on its inner lateral side, which is arranged to close the terminal ends of the above-described fluid supply passage 12 and fluid discharge passages 13$a$ and 13$b$.

The connector box 3 is also coupled with a terminal multiplex change-over valve unit 1 through the same coupling means as used for coupling the adjacent change-over valve units 1, namely, by means of paired coupling projections 25$a$ and 25$b$ and coupling grooves 26$a$ and 26$b$ and locking members 28. In the particular embodiment shown, the coupling projections 25$a$ and 25$b$ are provided on the part of the connector box 3 for engagement with the coupling grooves 26$a$ and 26$n$ on the part of the terminal change-over valve unit 1. However, in case the connector box 3 is attached to a change-over valve unit 1 at the opposite terminal end of the chained change-over valve assembly, the coupling grooves are provided on the part of the connector box 3 for engagement with the coupling projections on the opposing lateral side of the change-over valve unit.

Mounted on the outer lateral side of the connector box 3 is a multi-way connector 60 with a large number of pin terminals, which are electrically connected to the aforementioned feeder sockets 54 by way of power supply lines 61 within the cover 52.

Indicated at 62 in FIG. 2 are boltholes for fixing the multiple change-over valve assembly in position by means of bolts.

The above-described power supply lines 61 may be connected directly to the respective change-over valve units 1 without using the multi-way connector 60 if desired.

Further, if necessary, the supply and discharge manifold block 2 which is provided only at one of the head and tail ends of the multiple change-over valve assembly may be similarly provided at the other end of the latter.

Furthermore, the individual multiplex change-over valve units 1, which each contain a couple of fluid switching mechanisms 8A and 8B within the valve casing 9 in the above-described embodiment, may be arranged to incorporate three or more fluid switching mechanisms.

As clear from the foregoing description, according to the present invention, there can be obtained a chained multiple connection change-over valve assembly which is reduced in thickness to a drastic degree, by laterally connecting a plural number of multiplex change-over valve units which each contain a plural number of fluid switching mechanisms side by side in the transverse direction within a substantially flatly thin valve casing having a plural number of output ports in a row also in the transverse direction.

Besides, the respective change-over valve units can be coupled with each other or with a supply and discharge manifold block or a connector box in an extremely facilitated manner by the use of the coupling projections and grooves, while permitting to disconnect part of the change-over valve units easily at a desired position whenever necessary. Therefore, handling of the respective change-over valve units as well as replacements of component parts like valve bodies becomes far easier as compared with the conventional counterparts which have all the components fixed collectively by the use of a common rod or rail.

Further, since each multiplex change-over valve unit contain a plural number of fluid switching mechanisms within a single valve casing, it becomes possible to shorten the length of the multiple connection change-over valve assembly as a whole and to reduce the number of connections as compared with a chain of ordinary change-over valve units each containing a single fluid switching mechanism within a valve casing.

What is claimes is:

1. A multiple connection change-over valve assembly, comprising:

a plural number of laterally connected multiplex change-over valve units each of a flatly thin shape;

said multiplex change-over valve units each constituted by:

a valve casing of a flat shape measuring smaller in height than in width, the height of said valve unit being of a minimum necessary dimension for accommodation of one fluid switching mechanism or one output port whichever has a larger dimension in the vertical direction of said valve casing;

a plural number of fluid switching mechanisms built into said valve casing side by side in the transverse direction thereof for switching flow directions of a pressurized fluid;

joint faces provided on the opposite lateral sides of said valve casing for directly connecting said change-over valve unit to adjacent valve units;

pressurized fluid supply and discharge passages opened in the joint faces in communication with the respective fluid switching mechanisms for supplying and discharging said pressurized fluid; and a plural number of output ports provided on a front face of said valve casing in a row in the transverse direction and in communication with the respective switching fluid mechanisms.

2. A multiple connection change-over valve assembly as defined in claim 1, wherein said valve casing of each multiplex change-over valve unit is provided with coupling projections on one of said joint faces and coupling grooves on the other joint face, said coupling projections and grooves being engageable with and fixable to similar coupling grooves and projections on valve casings of adjacent multiplex change-over valve units by the use of locking means.

3. A multiple connection change-over valve assembly as defined in claim 1 or 2, wherein said pressurized fluid supply and discharge passages of adjacent multiplex change-over valve units are connected with each other by way of connector pipes having the opposite ends thereof fitted fluid tight in said supply and discharge passages of adjacent valve units.

4. A multiple connection change-over valve assembly as defined in claim 1, wherein a supply and discharge manifold block or a combination of a supply and discharge manifold block is connected to at least one of head and tail ends of the multiple connection change-over valve assembly, said supply and discharge manifold block being formed substantially in the same height as said multiplex change-over valve unit and having supply discharge ports opened on a front end face in a row in the transverse direction and in communication with said pressurized fluid supply and discharge passages of a change-over valve unit at the head or tail end of said multiple connection change-over valve assembly.

5. A multiple connection change-over valve assembly as defined in claim 4, wherein said connector box is connected to at least one of head and tail ends of said change-over valve assembly, said connector box having a multi-way connector connected to an electrical power supply to distribute electric power to the respective ones of said change-over valve units.

6. A multiplex change-over valve unit comprising:

a valve casing of a flat shape measuring smaller in height than in width, the height of said valve unit being of a minimum necessary dimension for accommodation of one fluid switching mechanism or one output port whichever has a larger dimension in the vertical direction of said valve casing;

a plural number of fluid switching mechanisms built into said valve casing side by side in the transverse direction thereof for switching flow directions of a pressurized fluid;

joint faces provided on the opposite lateral sides of said valve casing for directly connecting said change-over valve unit to adjacent valve units;

pressurized fluid supply and discharge passages opened in the joint faces in communication with the respective fluid switching mechanisms for supplying and discharging said pressurized fluid; and a plural number of output ports provided on a front face of said valve casing in a row in the transverse direction and in communication with the respective fluid switching mechanisms.

* * * * *